US012777567B2

(12) United States Patent
Elcock et al.

(10) Patent No.: US 12,777,567 B2
(45) Date of Patent: Oct. 27, 2026

(54) SYSTEM AND METHOD FOR COORDINATING INCREASING OR DECREASING INTENSITY OF A SET OF LIGHTS OVER TIME

(71) Applicant: MYRAINA, LLC, West Chester, PA (US)

(72) Inventors: Albert Fitzgerald Elcock, West Chester, PA (US); Marc Jasner, Horsham, PA (US); Andrew Elcock, West Chester, PA (US)

(73) Assignee: MyRaina, Inc., King of Prussia, PA (US)

( * ) Notice: Subject to any disclaimer, the term of this patent is extended or adjusted under 35 U.S.C. 154(b) by 16 days.

(21) Appl. No.: 18/982,312

(22) Filed: Dec. 16, 2024

(65) Prior Publication Data

US 2025/0203737 A1 Jun. 19, 2025

Related U.S. Application Data

(60) Provisional application No. 63/609,921, filed on Dec. 14, 2023.

(51) Int. Cl.

| | |
|---|---|
| ***H05B 47/16*** | (2020.01) |
| ***G06V 20/52*** | (2022.01) |
| ***G06V 40/10*** | (2022.01) |
| ***G08B 21/04*** | (2006.01) |
| ***H05B 47/11*** | (2020.01) |
| ***H05B 47/115*** | (2020.01) |
| ***H05B 47/125*** | (2020.01) |
| ***H05B 47/155*** | (2020.01) |
| ***H05B 47/17*** | (2020.01) |

(52) U.S. Cl.
CPC ........... *H05B 47/155* (2020.01); *G06V 20/52* (2022.01); *G06V 40/103* (2022.01); *G08B 21/043* (2013.01); *H05B 47/11* (2020.01); *H05B 47/115* (2020.01); *H05B 47/125* (2020.01); *H05B 47/16* (2020.01); *H05B 47/17* (2020.01)

(58) Field of Classification Search
CPC ........ H05B 47/11; H05B 47/16; H05B 47/17; H05B 47/115; H05B 47/125; H05B 47/155
See application file for complete search history.

(56) References Cited

U.S. PATENT DOCUMENTS

| | | | | |
|---|---|---|---|---|
| 11,115,899 | B1 * | 9/2021 | Sanders | H04W 40/248 |
| 2016/0286629 | A1 * | 9/2016 | Chen | F21S 2/00 |
| 2018/0041681 | A1 * | 2/2018 | Pope | F21V 23/0464 |
| 2019/0247528 | A1 * | 8/2019 | Rodriguez | A61L 2/26 |
| 2019/0373704 | A1 * | 12/2019 | Cristiani | G01J 1/0266 |
| 2022/0170321 | A1 * | 6/2022 | Casey | G01J 1/4204 |
| 2025/0119998 | A1 * | 4/2025 | Kann | H05B 47/11 |

* cited by examiner

*Primary Examiner* — Tung X Le
(74) *Attorney, Agent, or Firm* — Riverside Law LLP

(57) ABSTRACT

A method of coordinating increasing or decreasing intensity of a set of lights over time is described. The method includes the steps of detecting or predicting a fall; and triggering in tandem: a first light to first transition from a first illumination state to a second illumination state based on the detecting or predicting, and a second light to second transition from a third illumination state to a fourth illumination state based on the detecting or predicting. A system for coordinating increasing or decreasing intensity of a set of lights over time is also described.

12 Claims, 11 Drawing Sheets

SYSTEM AND METHOD FOR COORDINATING INCREASING OR DECREASING INTENSITY OF A SET OF LIGHTS OVER TIME

CROSS-REFERENCE TO RELATED APPLICATIONS

This application claims priority to U.S. provisional application No. 63/609,921 filed on Dec. 14, 2023 incorporated herein by reference in its entirety.

BACKGROUND OF THE INVENTION

Modern elderly care requires devices to improve conditions to reduce falls. Many conditions factor into why the elderly may fall inside their residence. Among the most common reasons for falls among the elderly resulting in injuries are diminished eyesight and hearing, loss of balance and flexibility and memory loss which will cause seniors to forget the basic steps to stay safe within their residence. Providing elderly people or people with special needs with proper lighting has several advantages. One way to prevent falls in elderly adults is to make sure that their living space is always well-lit. Clear sight helps seniors maintain balance and avoid obstacles. Furthermore, elderly adults often do not remember to turn on the lights or think they don't need them. Eliminating the need to turn on the lights ensures rooms, stairs, and hallways are always bright enough. Still further, arthritis, diminished hand flexibility and diminished strength can make it difficult to turn typical lamp knobs. Seniors are more likely to use proper lighting when it's easy to turn on. Growing older and vision impairment go hand in hand. Well-lit environments improve safety for the elderly.

Proper lighting therefore helps reduce the possibility of falls due to diminished eyesight. Automatic control of the lighting will reduce the need for the elderly to remember to manually control the lighting. Automatic control of lighting also solves issues related to the elderly's loss of flexibility to work the controls of lighting throughout the premises. In many cases, customized control of lighting is needed and is specific to the elderly person under care. This means any support for customized lighting control requires the capability to configure the control based on the needs of the individual. Moreover, specific configurations are needed to customize automatic lighting control based on the elderly person's living environment.

Most important, this automated control must occur when the elderly move around the premises or get up from resting positions and is specific to where this movement occurs. Well-lit environments improve safety for the elderly. Enhancing elderly care devices to reduce falls is critical. As home health monitoring systems are being used more and more, expanding their functionality to support automated control of lighting will be beneficial. There is a need to improve upon the existing support that current devices offer with improvements to controls and configurations needed when expanding home health monitoring systems functionality.

There are many lighting options available commercially for the elderly, including:

- Motion triggered night lights for when an elderly person needs to be mobile after dark and particularly after they have retired for the night. These lights are instant on when motion is detected and automatically turn off after some period of inactivity.

- Lights with remote switches to make turning on and off lights more easily accessible to the elderly.
- Lights with dimmer switches to enable the elderly to control the intensity of the lights.
- Lights with timers to turn off or on as needed.

However, none of the lights currently available combine timers with dimmer switches. In other words, there's no system that is available to automatically increase or decrease the intensity of lights over time. In addition, there are currently no light systems that are triggered and managed based on need (e.g. when an elderly person falls). For example, a light triggered by motion will turn on if a person falls (i.e. triggered by motion), however, the light will turn off after it's prescribed period even if the person is still in their felled position and needs help.

Further, conventional systems fail to provide the ability to recognize an elderly person and provide customized configuration of lighting control specific to that person. Adding innovative automated light control features clearly increases the safety of the elderly patient or patient(s) that are being monitored. The concepts discussed herein of a home health monitoring device adding functional support to increase safety of those being monitored is novel in and of itself and provides high value. Having a single device control both home health monitoring and automated light/environment control monitoring and automated safety control mechanisms in one device does not exist in current products. Typically, the elderly would need to have separate devices for home health monitoring and automated light control which complicates their premises and still fails to provide benefits discussed herein.

Accordingly, what is needed in the art is a lighting system and method that can better address the safety and well-being of elderly adults. Embodiments described herein fit this need.

SUMMARY OF THE INVENTION

In one embodiment, a method of modifying a living environment to assist in fall prevention includes the steps of detecting a first illumination level within the living environment; determining the first illumination level is below an illumination threshold; detecting a first body transition based on comparing a first detected body position to a second detected body position; determining the first body position transition is indicative of an unsafe transition; and increasing an illumination level within the living environment to a second illumination level that is greater than the first illumination level based on the determining the first illumination level and the determining the body position transition. In one embodiment, the increasing the illumination level comprises a gradual increase over a preset time. In one embodiment, the preset time is selected from a plurality of preset times, each of the plurality of preset times corresponding to a type of detected body position transition. In one embodiment, the gradual increase is a linear increase. In one embodiment, the gradual increase is a non-linear increase. In one embodiment, the gradual increase is algorithmic. In one embodiment, increasing the illumination level comprises increasing illumination in a subset of lights in the living environment. In one embodiment, the subset of lights is selected based on location of the detected first body transition. In one embodiment, the subset of lights is selected based on a type of detected body position transition. In one embodiment, the method includes detecting a second body transition based on comparing a third detected body position to a fourth detected body position. In one embodiment, the method includes determining the second body position transition is indicative of a safe transition and decreasing an illumination level within the living environment to a third illumination level that is less than the second illumination level. In one embodiment, the method includes determining the second body position transition is indicative of an unsafe transition and increasing an illumination level within the living environment to a third illumination level that is greater than the second illumination level. In one embodiment, the method includes determining if a subject is a person to be monitored based on data associated with the detecting. In one embodiment, the method includes changing an illumination color within the living environment based on the determining the first illumination level and the determining the body position transition. In one embodiment, the first detected body position is laying down. In one embodiment, the first detected body position is sitting. In one embodiment, the first detected body position is standing. In one embodiment, the second detected body position is laying down. In one embodiment, the second detected body position is sitting. In one embodiment, the second detected body position is standing.

In one embodiment, a system for modifying a living environment to assist in fall prevention includes a sensor, a camera and a light communicatively coupled to a controller configured to: receive a first signal from the sensor of a first illumination level within the living environment; determine the first illumination level is below an illumination threshold; receive a second signal from the cameral of a first body transition based on comparing a first detected body position to a second detected body position; determine the first body position transition is indicative of an unsafe transition; and increase an illumination level of the light within the living environment to a second illumination level that is greater than the first illumination level based on the determining the first illumination level and the determining the body position transition.

In one embodiment, a method of operating safety lighting when a fall is predicted or detected includes the steps of predicting or detecting a fall within a monitored area; triggering a first illumination state based on the predicted or detected fall; detecting a sustained fall; and triggering a second illumination state based on a detected sustained fall. In one embodiment, the method includes triggering a return to a default illumination state when a non-felled position is detected. In one embodiment, the first illumination state comprises a change in an illumination property from a prior illumination state, the illumination property comprising at least one of intensity, color or flashing. In one embodiment, the method includes triggering a light outside the monitored area based on the detected sustained fall. In one embodiment, the method includes holding the second illumination state based on a plurality of updated detections of a sustained fall. In one embodiment, the method includes increasing an intensity of the second illumination state based on a plurality of updated detections of a sustained fall. In one embodiment, the first illumination state comprises a gradual increase in an illumination property over a preset time. In one embodiment, the preset time is selected from a plurality of preset times, each of the plurality of preset times corresponding to a type of predicted or detected fall. In one embodiment, the gradual increase is a linear increase. In one embodiment, the gradual increase is a non-linear increase. In one embodiment, the gradual increase is algorithmic. In one embodiment, increasing the illumination property comprises increasing an illumination property in a subset of lights. In one embodiment, the subset of lights is selected based on location of the predicted or detected fall. In one embodiment, the subset of lights is selected based on a type of predicted or detected fall. In one embodiment, the method includes determining if a subject is a person to be monitored based on data associated with the predicted or detected fall.

In one embodiment, a system for operating safety lighting when a fall is predicted or detected includes a camera and a light communicatively coupled to a controller configured to predict or detecting a fall within a monitored area based on a first signal received from the camera; trigger a first illumination state based on the predicted or detected fall; detect a sustained fall based a plurality of subsequent signals received from the camera; and trigger a second illumination state based on a detected sustained fall.

In one embodiment, a method of coordinating increasing or decreasing intensity of a set of lights over time includes the steps of detecting a fall; and triggering in tandem: a first light to first transition from a first illumination state to a second illumination state based on the detecting, and a second light to second transition from a third illumination state to a fourth illumination state based on the detecting. In one embodiment, the method includes triggering a return to a default illumination state when a non-felled position is detected. In one embodiment, the first transition comprises a change in an illumination property from a prior illumination state, the illumination property comprising at least one of intensity, color or flashing. In one embodiment, the method includes holding the second illumination state based on a plurality of updated detections of a sustained fall. In one embodiment, the method includes increasing an intensity of the second illumination state based on a plurality of updated detections of a sustained fall. In one embodiment, the first transition comprises a gradual increase in an illumination property over a preset time. In one embodiment, the preset time is selected from a plurality of preset times, each of the plurality of preset times corresponding to a type of predicted or detected fall. In one embodiment, the gradual increase is a linear increase. In one embodiment, the gradual increase is a non-linear increase. In one embodiment, the gradual increase is algorithmic. In one embodiment, Increasing the illumination property comprises increasing an illumination property in a subset of lights. In one embodiment, the subset of lights is selected based on location of the predicted or detected fall. In one embodiment, the subset of lights is selected based on a type of predicted or detected fall. In one embodiment, the method includes determining if a subject is a person to be monitored based on data associated with the detected fall.

In one embodiment, a system for coordinating increasing or decreasing intensity of a set of lights over time including a camera, a first light and a second light communicatively coupled to a controller configured to: detect a fall based on a signal received from the camera; and trigger in tandem: the first light to first transition from a first illumination state to a second illumination state based on the detecting, and the second light to second transition from a third illumination state to a fourth illumination state based on the detecting.

In one embodiment, a method for operating safety lighting when a fall is predicted or detected includes the steps of predicting or detecting a fall; triggering a light to illuminate based on the predicted or detected fall; detecting a sustained fall; and triggering a change in an illumination property based on the detected sustained fall. In one embodiment, the method includes triggering the light to return to a default illuminated state when a non-felled position is detected. In one embodiment, the change in the illumination property is at least one of intensity, color or flashing. In one embodiment, the method includes triggering a light outside the monitored area based on the detected sustained fall.

In one embodiment, a method to automatically increase or decrease the intensity of a light based on a body position includes the steps of detecting a body changed to a second position from a first position; and triggering a light to transition from a first illumination state to a second illumination state over a predetermined period of time based on the detecting. In one embodiment, the first position is laying down. In one embodiment, the first position is sitting. In one embodiment, the first position is standing. In one embodiment, the second position is laying down. In one embodiment, the second position is sitting. In one embodiment, the second position is standing. In one embodiment, the second illumination state is a higher intensity than the first illumination state. In one embodiment, the second illumination state is a lower intensity than the first illumination state. In one embodiment, the transition is linear. In one embodiment, the transition is non-linear. In one embodiment, the transition is algorithmic. In one embodiment, the transition type is selected corresponding to the set of first and second positions detected. In one embodiment, the method includes recognizing the body as a person to be monitored.

In one embodiment, a method for tandem operating safety lighting when a fall is predicted or detected including the steps of predicting or detecting a fall; triggering a first and second light to illuminate based on the predicted or detected fall; detecting a sustained fall; triggering a first and second change in first and second illumination properties of the first and second light based on the detected sustained fall. In one embodiment, the first and second illumination property are the same. In one embodiment, the first and second illumination property are different. In one embodiment, when a non-felled position is detected, both lights return to a default illuminated state. In one embodiment, the change in illumination property is at least one of intensity, color or flashing. In one embodiment, the first light may is located in the monitored area while the second light is outside the monitored area.

In one embodiment, a system for operating safety lighting when a fall is predicted or detected includes a monitoring system comprising a sensor and a communications module communicatively coupled to a controller; and a first light communicatively coupled to the controller; where the controller is configured to receive a signal indicative of a predicted or detected fall, send an illumination signal to the first light based on the received predicted or detected fall signal, receive a signal indicative of a sustained fall, and send an illumination signal to the first light to change an illumination property of the first light based on the detected sustained fall. In one embodiment, the controller is configured to send an illumination signal to the first light to return to a default illuminated state when a non-felled position is detected. In one embodiment, the change in the illumination property is at least one of intensity, color or flashing. In one embodiment, the controller is configured to send a signal to a second light based on the detected sustained fall.

A system to automatically increase or decrease the intensity of a light based on a body position including a monitoring system comprising a sensor and a communications module communicatively coupled to a controller; and a first light communicatively coupled to the controller; where the controller is configured to detect a body changed to a second position from a first position, and triggering the first light to transition from a first illumination state to a second illumination state over a predetermined period of time based on the detecting. In one embodiment, the first position is laying down. In one embodiment, the first position is sitting. In one embodiment, the first position is standing. In one embodiment, the second position is laying down. In one embodiment, the second position is sitting. In one embodiment, the second position is standing. In one embodiment, the second illumination state is a higher intensity than the first illumination state. In one embodiment, the second illumination state is a lower intensity than the first illumination state. In one embodiment, the transition is linear. In one embodiment, the transition is non-linear. In one embodiment, the transition is algorithmic. In one embodiment, the transition type is selected corresponding to the set of first and second positions detected. In one embodiment, the controller is configured to recognize the body as a person to be monitored.

In one embodiment, a system for tandem operating safety lighting when a fall is predicted or detected includes a monitoring system comprising a sensor and a communications module communicatively coupled to a controller; and a first light communicatively coupled to the controller; where the controller is configured to predict or detect a fall, trigger a first and second light to illuminate based on the predicted or detected fall, detect a sustained fall, and trigger a first and second change in first and second illumination properties of the first and second light based on the detected sustained fall. In one embodiment, the first and second illumination property are the same. In one embodiment, the first and second illumination property are different. In one embodiment, when a non-felled position is detected, the controller is configured to direct both lights to return to a default illuminated state. In one embodiment, the change in illumination property is at least one of intensity, color or flashing. In one embodiment, the first light may is located in the monitored area while the second light is outside the monitored area.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION OF THE INVENTION

Figure 1A:
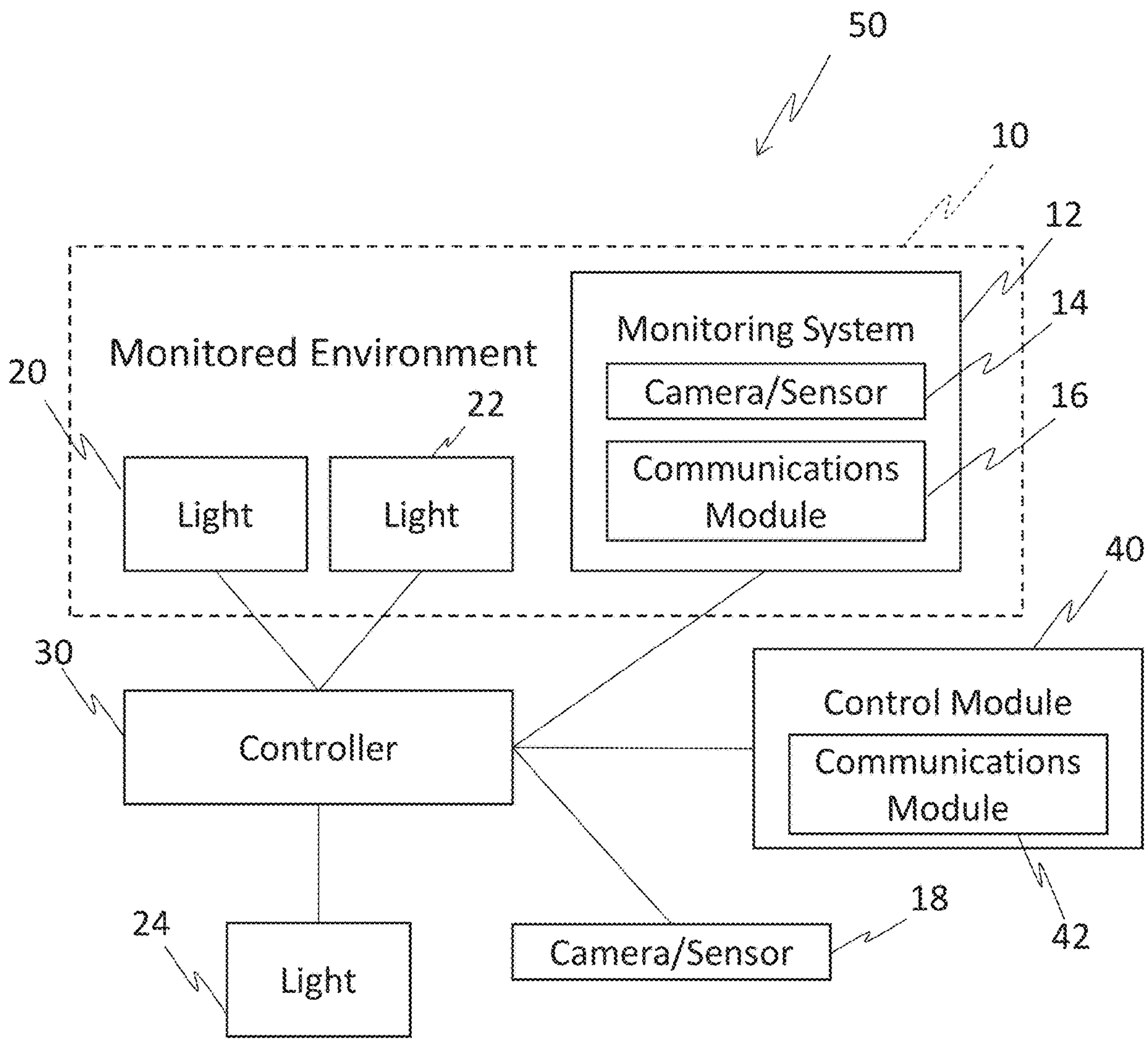
FIG. 1A is a diagram of a safety lighting system according to one embodiment.

It is to be understood that the figures and descriptions of the present invention have been simplified to illustrate elements that are relevant for a more clear comprehension of the present invention, while eliminating, for the purpose of clarity, many other elements found in systems and methods of safety lighting. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is safety lighting system and method.

Embodiments of the invention involve incorporating unique configurations and controls into a home health monitoring device. Further, embodiments of the invention leverage key features already included in the home health monitoring device to enhance the functionality of the new features being added. Details as to how these current features are used to aid in a novel customized automated control of lighting will be explained below.

Home heath monitoring device features to leverage:

Wireless communication capability allows integration with existing IOT light control systems.

Learn mode button which uses mechanisms to allow identification of a particular elderly patient or patient(s) being monitored.

Utilization of the camera(s) to sense position and motion of the elderly.

Keys features for configuration and control of automated lighting by home health monitoring device:

The ability to provide customized configuration of automated lighting control based on the individual's needs. For example, one elderly person may require different light control functionality when they wake up and go to sleep from another elderly person. This includes specific controls based on the individual's needs for color and/or intensity changes of the lighting.

The ability to provide customized configuration of automated lighting control based on the specific premises where the elderly are being monitored. For example, even though this invention may leverage the ability to control the lighting via an off-the-shelf IOT solution, there should be an ability to customize how one premises is controlled different from another premises for safety reasons.

The ability to configure specific lighting controls to be carried out when the device senses specific types of movement by the elderly person trigger. For example, different lighting controls and enhanced intensity controls would be carried out if the elderly's movement of position suggests they are getting up or laying down to rest.

Carrying out specific lighting changes if the device senses that the elderly person has fallen.

Carrying out control of lighting at a moment's notice and at the time that it is needed the most.

Configure specific controls of the color of lighting and the intensity of lighting.

Embodiments of the safety lighting system may include one or more of the following components: a sensor such as a camera or Wi-Fi doppler or other monitoring or detection system such as a wearable device or a handheld mobile device, a mobile application, a computing device such as a cloud server, one or more lights, and a communications module or access point which can include for example a router or modem. Embodiments of the invention utilize an integrated camera or cameras, an integrated LCD display, a processing system with multiple neural networks used to detect health-related conditions, a Cloud component that interprets the outputs of the neural networks, and a mobile (client) application that receives alerts when health-related conditions are detected.

Specific to embodiments of the invention is Wi-Fi capability and interaction with IOT devices that support a multitude of lighting controls. It should be noted that embodiments of the invention will make use of existing IOT light control functionality such as Amazon Custom Skill based IOT lighting control. Embodiments of the device include a processor (CPU), an integrated camera, an integrated LCD display, wireless interfaces, dynamic memory and one or more AI accelerators. The permanent storage, peripherals and learn mode button provide optional feature additions for extensibility.

With reference now to FIG. 1A, in one embodiment, a light safety system includes one or more lights 20, 22 in a monitored environment 10 that can be for example a room, series of rooms, a particular area, or a field of view for the monitoring system 12. The monitoring system 12 can include one or more cameras or sensors 14 for detecting for example when an elderly person is present, not present, awake, asleep, moving, not moving, making sounds, not making sounds, or in a particular positional state such as in an upright or felled position. The monitoring system 12 can include a communications module 16 for communicating the monitoring data with a controller 30 that communicates with the lights 20, 22. The controller 30 can also control one or more lights 24 positioned outside the monitored environment 10. Another camera or sensor 18 can be configured outside the monitored environment 10 to collect additional data to impact lighting settings, such as an outdoor or ambient lighting sensor. A control module 40 can communicate with the controller 30 via a communications module 42. The control module 40 can for example be one or a series of computing devices such as a handheld mobile device or computer that provide input and output functionality to the controller for providing lighting settings or for example confirming whether a detected state of the person monitored is correct. Multiple devices can be used, for example by elderly users in the monitored environment 10 and by medical professionals or caretakers in the environment or from a remote location.

Figure 1B:
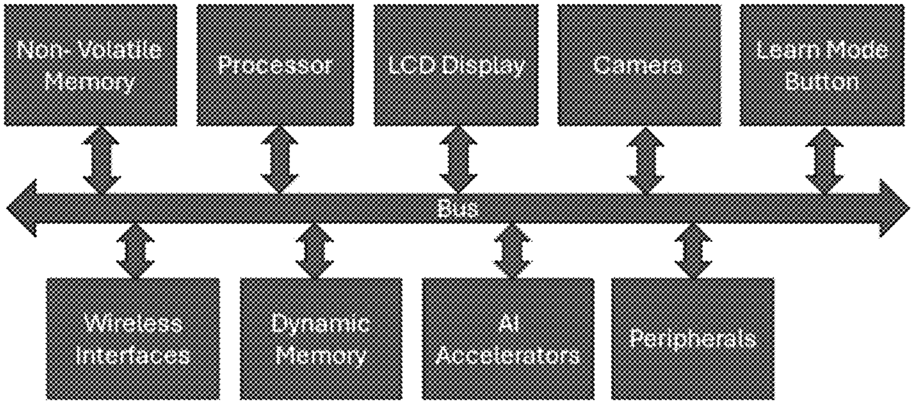
FIG. 1B is a hardware block diagram according to one embodiment.

With reference now to FIG. 1B, a hardware block diagram is described according to one embodiment.

Non-Volatile Memory

Non-Volatile memory in one embodiment is an optional component that would be used to enable subscribers to access real-time and buffered full images once a triggering event occurs. These encrypted images are stored locally in the camera system and can only be retrieved using special access rights (see e.g. FIG. 7). The following three conditions are required to enable image buffering according to one embodiment:

The presence of one or more people being monitored.

Non-volatile storage is installed.

The feature to optionally buffer images is enabled.

Using a circular, configurable image buffer (default is 15 minutes), the system begins recording encrypted images when the conditions above are met. However, images are only stored encrypted for retrieval later after a triggering event occurs. There are three types of events defined:

Lifestyle Event—A reported event, such as when going from sitting to standing, to the care network or an in-home care provider that co-presence or closer monitoring may be required.

Monitoring Event—A reported event to the care network, such as a pattern of instability when going from sitting to standing, which may indicate the need for personalized care.

Triggering Event—A reported event to the care network, such as a fall or smoke detection, which is likely to require an emergent response.

Encrypted, stored images can be made available to one or more people in the care network via a well-known transport mechanism such as HTTPS, FTP, etc. Subscribers are given the option to store buffered recordings in storage locations of their choosing. For example, using a mobile application they may choose Google, Apple, or another popular Cloud storage service.

Additionally, once a triggering event occurs, subscribers are given the option to immediately "check-in". Selecting this option will give them the ability to immediately view the 7½ minutes of encrypted video buffer immediately preceding the notification. alternatively, non-volatile storage could be used to buffer signature data, and/or decoded signature data (i.e. skeletal representations of the images). This buffered data could be stored for later use or analysis to improve medical treatments for the elderly. For example, under certain circumstances, subscribers may wish to share recorded video with care providers such as physical therapists or other clinicians without making images available.

Processor (CPU)

The CPU is an integral component of any computer-based system controlling the interpretation and execution of instructions.

Integrated LCD Display

The integrated lcd display normally functions to communicate the date and/or time of day (i.e. a digital clock). It could also be used to display photos and other interesting content while monitoring one or more people.

During installation of the health monitoring system, the primary uses of the lcd display are to ensure there is:

Proper visibility of the person being monitored and effective coverage of the living space of the person being monitored by routing the full, real-time video output of the camera to the display.

An indication that the health monitoring system is in proximity to a Wi-Fi access point to ensure proper wireless connectivity.

Instructions on how to properly configure and position the health monitoring system. Step-by-step set-up instructions could also be provided on the display.

The display can show an option to exit installation mode on the lcd display. touchscreen is disabled once the health monitoring system exits installation mode. During the process of ensuring the health monitoring system is properly located, all network/wireless ports are disabled to protect from any potential hacking to gain access to these video images. The video being processed by the camera during health monitoring system positioning is only sent to the integrated lcd display.

Integrated Camera

Specifics of the camera include both day and night vision with night vision being an important feature. In addition, the camera leverages an array of cameras that are used for more comprehensive room coverage for almost 100% field of view, and aggregates full and partial images to improve accuracy while creating signature data Current camera solutions used for monitoring employ only one camera lens in their camera system resulting in a limited or directional view angle. Current monitoring systems for the most part do not integrate their camera into the device itself. They may be connected via wi-fi or Bluetooth leaving this limited view angle can be effective for contexts where the mobility of the person being monitored is restricted to a more confined area. However, this limited view is not as effective in a situation where a camera will be used to monitor an elderly person with good mobility. While fisheye lenses do increase the field of view and are a useful addition, it still results in a limited field for view for an indoor monitoring application because of the short distance between the camera and a person of interest.

Learn Mode Button

The learn mode button is an optional button that when depressed after the setup process, which includes identifying the person or persons being monitored, puts the camera system into a mode where baseline signatures are created, including baseline signatures for:

Nominal body posture when sitting and standing. For example, does the person slouch when sitting? Are they bent over when standing?

Nominal ambulation characteristics. For example, does the person use an aid such as a walking stick or a walker? Does the person walk with a limp?

Developing a baseline enables more effecting monitoring or change or high-risk behaviors. For example, a person who should be using a cane or walker, but instead is furniture cruising is at an increased risk of falling.

Learn mode will automatically exit to monitoring mode after a predefined period. This period is based on whether algorithms, like the number of hours the person being monitored, amount of time sitting, standing and walking are satisfied.

Wireless Interfaces

Mandatory wireless interfaces to enable proper functionality of this camera solution include Wi-Fi and Bluetooth. Wi-fi is used for network connectivity and enables real-time communication with servers in the cloud. Bluetooth is used during the setup process to privately transfer credentials from a mobile device previously used on the Wi-Fi network for easy setup.

In addition, Bluetooth is also envisioned to be used to develop extended features such as direct connection to BT-enabled earpieces to enhance communication with the hearing-impaired, and the external addition of microphones and speakers. Adding external BT microphones and speakers overcomes the shortcoming of an elderly person trying to speak into a camera system that is located at least 5-feet high on a wall and possibly 10 or more feet from someone who needs help. By placing BT-enabled microphones/speakers in one or more locations around the room effective communication is more easily enabled.

Bluetooth and other wireless interfaces enable integration with other critical connected systems such as IOT Lighting control systems, thermostats, smoke alarms and other home appliances. While mobile applications and other control applications are typically available with today's home appliances, their use is not associated with the lifestyles of an elderly person. For example, repeatedly forgetting to close a refrigerator door could indicate onset of a memory-related problem.

During Camera positioning and set up, these ports are temporarily shut off to protect the user from any potential hacking.

Dynamic Memory

As with all CPU-driven systems, dynamic memory is needed as a central workhorse for creating buffers and moving data across system interfaces.

AI Accelerator

One or more AI accelerators is needed to gain the required responsiveness needed to generate signature data. In using an AI accelerator, the CPU is offloaded, and the overall performance of the system increases to ensure necessary responsiveness. Additionally, AI accelerators are purpose built for the types of calculations necessary for the operation of features of the system, and therefore offer far superior performance to standard CPUs.

Peripherals

Peripherals include optional components such as microphones and speakers. While not an essential part of the solution, they can provide good enhancements for contexts that warrant them. For example:

They can be used to enable 2-way communication.

The microphone can be used in conjunction with machine learning to determine whether an alarm has been triggered (i.e. smoke alarm, door alarms-fridge door left open too long, front or back door open, etc.).

The speaker could additionally be used as an alarm for cases where emergent attention is needed. An alarm feature is important in contexts where more than one elderly person is living as hearing impairment is common among the elderly. Cases have been recorded where an elderly person's cry for help was not heard by their partner because of their partner's hearing impairment.

Key Features for Configuration and Control of Automated Lighting in a Home Health Monitoring Device Key feature used in this invention will now be described. As we discuss the various methods that will be covered in this invention, it will become clearer how these key features are used.

Customized Configuration and Control of Automated Lighting Control Based on an Individual's Needs:

Since a home health monitoring device has the ability to identify a person using its camera and specialized recognition processing, this capability can be leveraged to configure specific automated lighting control for that person. Depending on the individual we may want to adjust the color, level of intensity or the speed at which the intensity changes to make them more comfortable.

Embodiments of the home heath monitoring system will include an automated lighting control configuration function which when entered will list the specific monitored patients and will allow the user to configure specific parameters that can be used across all lighting controls that would affect lighting controls when that individual performs certain actions about the premises.

Once again, since the home health monitoring device can determine baseline signatures when using the "learn button" feature or other learning methods, from this the device can determine of the individual is getting up from bed or laying down to go to bed. This home heath monitoring system leverages this capability for its automated lighting control configuration for that individual. One elderly person for example may require different light control functionality when they wake up and go to sleep from another elderly person.

Customized Configuration and Control of Automated Lighting Control Based on the Premises:

Embodiments of the home heath monitoring system's automated lighting control configuration function will also include the ability to configure the automated lighting control based on the specific premises where the elderly are being monitored. Most off the shelf IOT based lighting control devices will have all the lights under its control listed with names to identify them. When entering the automated lighting control configuration function, the home health monitoring device is already communicating to the IOT device and obtains the list of lights. This list is then provided to the user so they can make specific adjustments for lighting control based on the type of light and where the light is located. Different lights would naturally require different controls. Also, rooms like the kitchen versus the bedroom may also require different lighting control. This feature not only makes it more comfortable for the monitored patient but is also required for safety reasons.

Once again, since a home health monitoring device has the ability to store specific information on a premises-by-premises basis this capability can be leveraged for this feature.

Customized Configuration and Control of Automated Lighting Control Based on the Person's Movement:

The ability for different lighting controls to be carried out when the device senses specific types of movement is central to embodiments of the invention. For example, different lighting controls and enhanced intensity controls would be carried out if the elderly's movement of position suggests they are getting up or laying down to rest. The methods described herein provide some of the use cases.

Embodiments of the invention provide an automated lighting control feature based on a person's movement. Embodiments of the invention also provide a mechanism to customize this control when entering automated lighting control configuration function for a specific individual. Embodiments also have the ability to customize the lighting control for a specific movement depending on where the monitored patient is at the time of the movement. For example, carrying out specific lighting changes if the device senses that the elderly person has fallen in a specific room.

Another key aspect of this feature is control of lighting at a moment's notice and at the time that it is needed the most. Elderly people will not be able to react as fast as the home health monitoring device would and this increases the safety of the person being monitored. Again, the home health monitoring device has many capabilities that can be leveraged to carry out this aspect of the invention. Home health care monitoring provides the capability to determine if the elderly is resting, is getting up or has fallen.

Customized Coordination of Automated Control of Different Lights Throughout the Premises:

Embodiments of the invention provide coordination of automated control of different lights on the premises. Some of the methods described herein highlight the need for this feature. When entering the automated lighting control configuration function customized configuration can be made based on the individual and premises. It is once again clear that we many of the home health monitoring device's capabilities can be leveraged to implement this aspect of the invention.

Accordingly, aspects of the invention have the following advantages: (a) the home health monitoring device's functionality is enhanced with automated configuration and control of lighting; (b) the home health monitoring device's ability to provide customized configuration and control of automated lighting control based on an individual's needs; (c) the home health monitoring device's ability to provide customized configuration and control of automated lighting control based on the premises (e.g. 2 rooms versus 5 rooms); (d) the home health monitoring device's ability to provide customized configuration and control of automated lighting control based on the person's movement; and (e) the home health monitoring device's ability to provide customized coordination of automated control of different lights throughout the premises.

Figure 2:
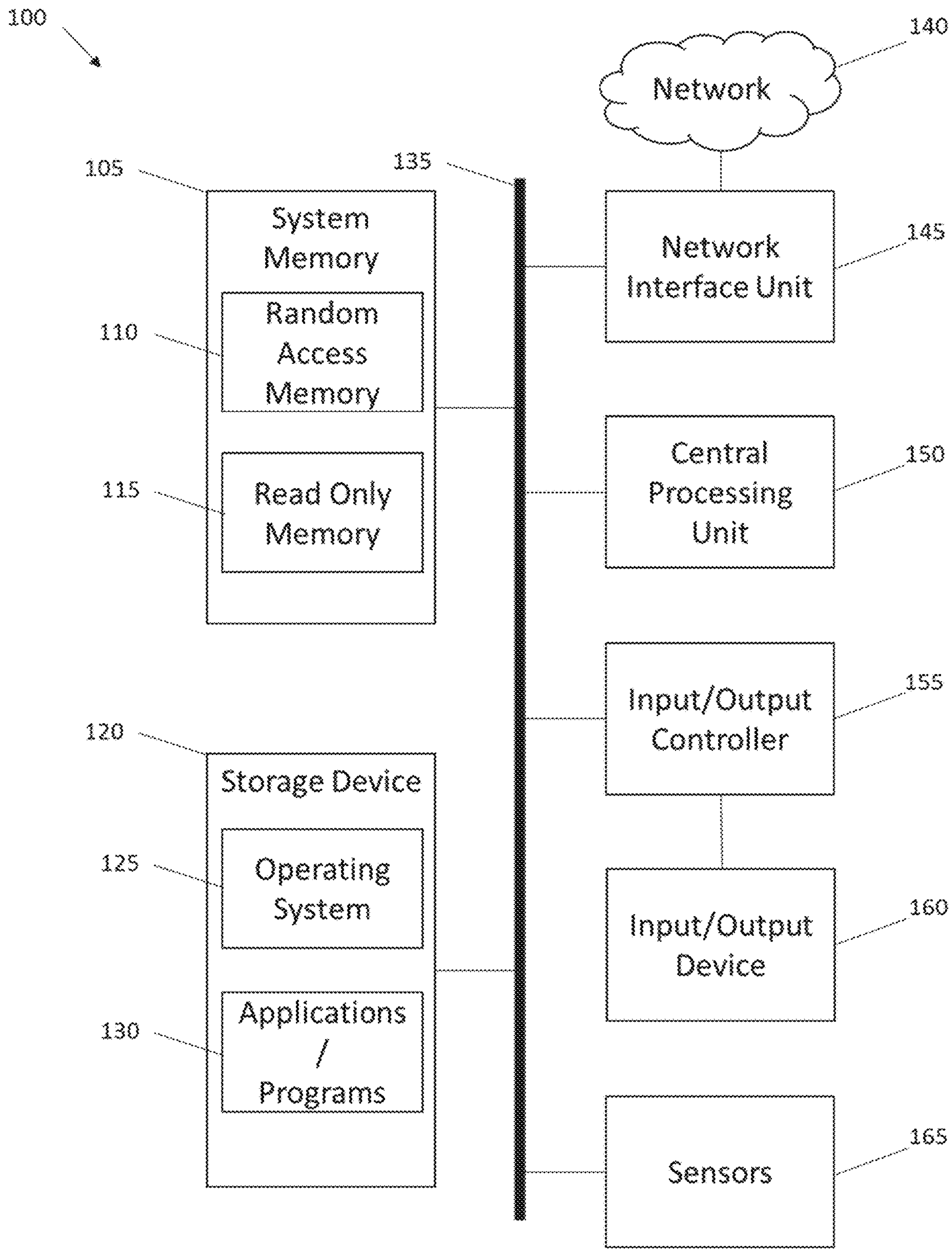
FIG. 2 is a diagram of a computing environment for a safety lighting system according to one embodiment.

With Reference Now to FIG. 2, a System and Method for

In one embodiment, each light or light module can be assigned a unique ID (UID). For certain methods as described further below, a sensor may not specifically be required, but may be applicable or desired. Lights or light modules can include the types of lights known in the art any typically found in home or living environments. The lighting may include but is not limited to:

Ceiling Fixtures such as: Chandeliers: Ornate hanging fixtures with multiple arms and lights. Pendant Lights: Single light fixtures that hang from the ceiling. Flush Mounts: Fixtures that are attached directly to the ceiling with no gap between the fixture and the ceiling.

Wall-Mounted Fixtures such as: Sconces: Decorative fixtures that are mounted on walls.

Recessed Lighting such as: Can Lights: Fixtures that are installed into the ceiling, providing a sleek and modern look.

Track Lighting such as: Adjustable fixtures mounted on a track, allowing for flexibility in directing light.

Table Lamps such as: Portable lamps designed to be placed on tables or other surfaces.

Floor Lamps such as: Tall standing lamps designed to be placed on the floor.

Under-Cabinet Lighting such as: Lights installed beneath kitchen cabinets to illuminate countertops.

Desk Lamps such as: Lamps specifically designed for providing task lighting on desks or workspaces.

Accent Lighting such as: Lights used to highlight specific objects or areas, such as spotlights or picture lights.

Bathroom Fixtures such as: Vanity Lights: Lights mounted above or beside bathroom mirrors for grooming tasks. Fan Lights: Lights integrated into exhaust fans.

Outdoor Lighting: Porch Lights: Fixtures mounted on exterior walls near entryways. Landscape Lights: Fixtures designed to illuminate outdoor landscaping.

Step Lights: Fixtures installed on stairs or pathways for safety and aesthetics.

These are just a few examples, and there are many more specialized and decorative light fixtures available for various purposes and styles.

The methods described herein may also be combined with motion detection technology. The system in one embodiment can be configured to include steps to associate the light or light module to one or more of the following:

(1) ASSOCIATE light(s) with one or more sensors (and/or associate light(s) with one or more persons).

(2) ASSOCIATE a mobile application with light(s) (or the mobile app is pre-configured for association with a sensor and person).

The Triggering Process in one embodiment can activate a light or light module as follows:

(1) Detect a triggering condition which could be for example:

(a) A fall predicted or detected by a monitoring system (b) A mobile application control (c) A push-button or switch on a pre-configured light (d) Someone getting out of bed (2) Turn on light(s)

(3) Check triggering condition (a) Is condition still true?

(i) YES, light(s) remain on (ii) NO, turn off light(s). Note: If there is no sensor or monitoring system, the "off" signal would be the result of an expired timer In some aspects of the safety lighting system, software executing the instructions provided herein may be stored on a non-transitory computer-readable medium, wherein the software performs some or all of the steps of the embodiments when executed on a processor.

Aspects of the safety lighting system relate to algorithms executed in computer software. Though certain embodiments may be described as written in particular programming languages, or executed on particular operating systems or computing platforms, it is understood that the safety lighting system is not limited to any particular computing language, platform, or combination thereof. Software executing the algorithms described herein may be written in any programming language known in the art, compiled or interpreted, including but not limited to C, C++, C#, Objective-C, Java, JavaScript, MATLAB, Python, PHP, Perl, Ruby, or Visual Basic. It is further understood that elements of the safety lighting system may be executed on any acceptable computing platform, including but not limited to a server, a cloud instance, a workstation, a thin client, a mobile device, an embedded microcontroller, a television, or any other suitable computing device known in the art.

Parts of the safety lighting system are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of the safety lighting system are described as communicating over a variety of wireless or wired computer networks. For the purposes of embodiments of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth, Bluetooth Low Energy (BLE) or Zigbee communication links, or any other method by which one electronic device is capable of communicating with another. In some embodiments, elements of the networked portion of the safety lighting system may be implemented over a Virtual Private Network (VPN).

FIG. 2 and the following discussion are intended to provide a brief, general description of a suitable computing environment in which the safety lighting system may be implemented according to one embodiment. While the safety lighting system is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The safety lighting system may also be practiced in distributed computing environments where tasks are performed by remote processing devices that are linked through a communications network. In a distributed computing environment, program modules may be located in both local and remote memory storage devices.

FIG. 2 depicts an illustrative computer architecture for a computer 100 for practicing the various embodiments of the invention or for example operating as the controller. The computer architecture shows a conventional personal computer, including a central processing unit 150 ("CPU"), a system memory 105, including a random-access memory 110 ("RAM") and a read-only memory ("ROM") 115, and a system bus 135 that couples the system memory 105 to the CPU 150. A basic input/output system containing the basic routines that help to transfer information between elements within the computer, such as during startup, is stored in the ROM 115. The computer 100 further includes a storage device 120 for storing an operating system 125, application/program 130, and data.

The storage device 120 is connected to the CPU 150 through a storage controller (not shown) connected to the bus 135. The storage device 120 and its associated computer-readable media, provide non-volatile storage for the computer 100. Although the description of computer-readable media contained herein refers to a storage device, such as flash memory, a hard disk or CD-ROM drive, it should be appreciated by those skilled in the art that computer-readable media can be any available media that can be accessed by the computer 100.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the safety lighting system, the computer 100 may operate in a networked environment using logical connections to remote computers through a network 140, such as TCP/IP network such as the Internet or an intranet. The computer 100 may connect to the network 140 through a network interface unit 145 connected to the bus 135. It should be appreciated that the network interface unit 145 may also be utilized to connect to other types of networks and remote computer systems. Connections between devices and modules can be wired or wireless connections with examples of connection types and modalities explained in further detail below.

The computer 100 may also include an input/output controller 155 for receiving and processing input from a number of input/output devices 160, including a keyboard, a mouse, a touchscreen, a camera, a microphone, a controller, a joystick, or other type of input device. Similarly, the input/output controller 155 may provide output to a display screen, a printer, a speaker, or other type of output device. The computer 100 can connect to the input/output device 160 via a wired connection including, but not limited to, fiber optic, ethernet, or copper wire or wireless means including, but not limited to, Wi-FI, Bluetooth, Near-Field Communication (NFC), infrared, or other suitable wired or wireless connections.

As mentioned briefly above, a number of program modules and data files may be stored in the storage device 120 and RAM 110 of the computer 100, including an operating system 125 suitable for controlling the operation of a networked computer. The storage device 120 and RAM 110 may also store one or more applications/programs 130. In particular, the storage device 120 and RAM 110 may store an application/program 130 for providing a variety of functionalities to a user.

The computer 100 in some embodiments can include a variety of sensors 165 for monitoring the environment surrounding and the environment internal to the computer 100. These sensors 165 can include physiological sensors, sensors on household appliances and mechanical systems, a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

In one embodiment, a system and method automatically highlight a fall utilizing a light triggered on by a monitoring system. For example, a light can be triggered to turn on by a fall detection monitoring system once a fall is predicted or detected. The light may remain on for the duration of time the person is detected to be in a felled position. The light is then turned off via an application interface (such as a mobile app) or when the felled indication is removed, or power is no longer applied. The light may automatically increase in intensity, change colors and/or flash with a steady or variable frequency (e.g. higher frequency as time increases) the longer the person remains in a felled position. Or for example, the light color may indicate a particular detected characteristic (e.g. the person is felled, but movement/sound is detected or not detected) while the flash frequency indicates another characteristic (e.g. time elapsed in the felled position). The light is used as a notification device to alert someone in a different location (i.e. not co-located with the person being monitored).

Figure 3:
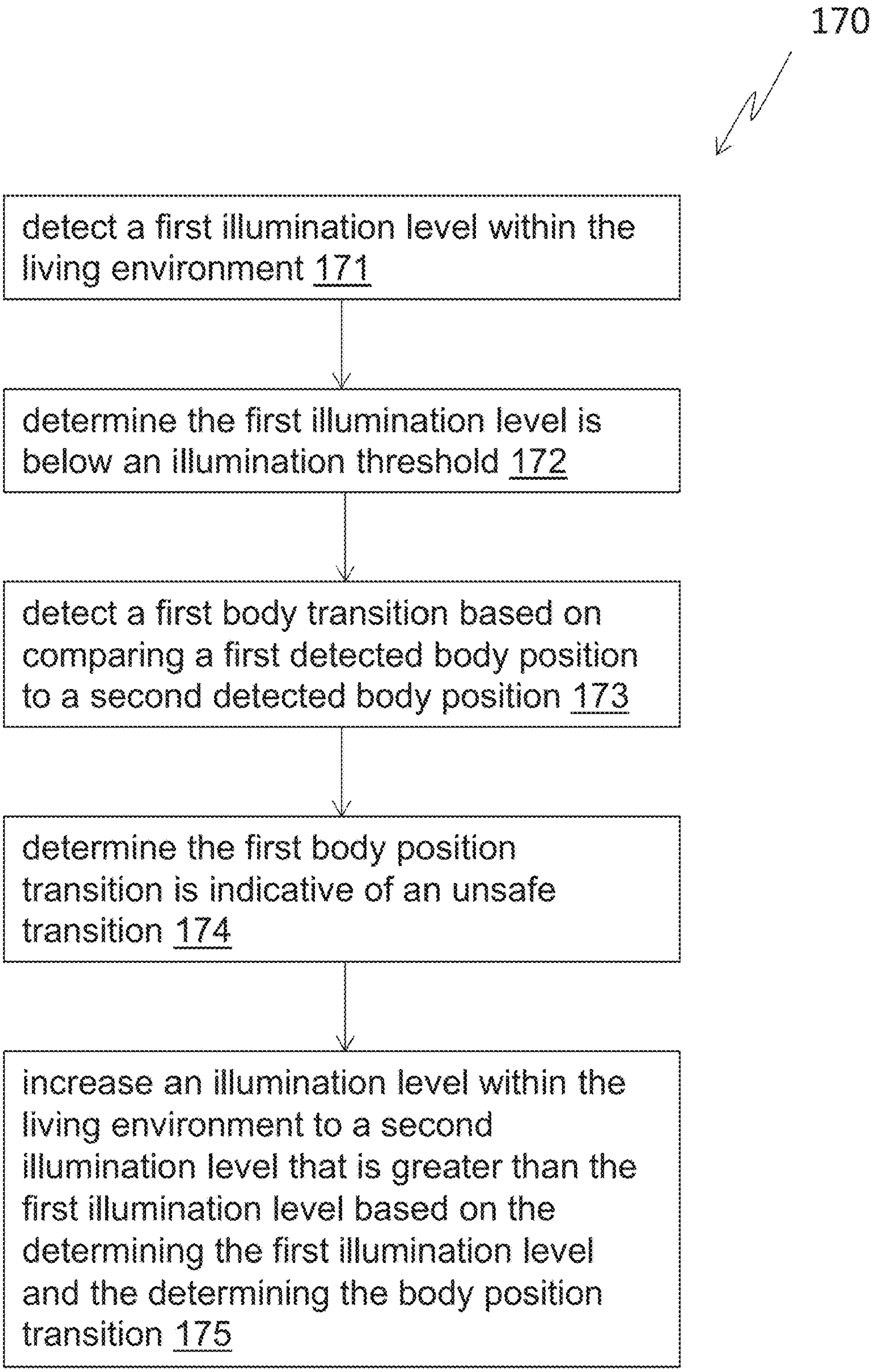
FIG. 3 is a flow chart of a method of modifying a living environment to assist in fall prevention according to one embodiment.

With reference now to FIG. 3, a method 170 of modifying a living environment using visual aids to assist in fall prevention is described according to one embodiment. The method 170 may include the steps of detecting a first illumination level within the living environment 171, determining the first illumination level is below an illumination threshold 172, detecting a first body transition based on comparing a first detected body position to a second detected body position 173, determining the first body position transition is indicative of an unsafe transition 174, and increasing an illumination level within the living environment to a second illumination level that is greater than the first illumination level based on the determining the first illumination level and the determining the body position transition 175.

As previously mentioned, seniors sometimes forget to turn on the lights or feel they don't need them. Removing the need to turn on the lights is a great way to make sure rooms, stairs, and hallways are always bright enough. Embodiments of this method combine detecting that (1) the living space is dark or not well lit, and (2) the subject in question is in the process of transitioning from a safe position or to a less safe or unsafe position (e.g. from a sitting to a standing position or from a laying to a sitting position). Determining an unsafe transition may for example based on detecting a transition to a less stable position or a transition to a position associated with a higher level of risk for injury.

Once it is determined that the subject is in this transition from safe to unsafe in a dimly lit environment, the monitoring system triggers on lights to increase the potential for safe movement about the living space. Options would include, for example, pre-configuring the system to turn on lights in the most frequented living areas at night such as the bedroom and bathroom, and associated hallways. In addition, embodiments automatically increase the intensity of the lights as the subject is transitioning from a safe position to a potentially unsafe movement to provide the opportunity for their eyes to adjust and avoid the startling, blinding intensity of full-on lighting. This would enable a slow transition from dark to light as someone is getting out of bed, for example. The reverse process would be applied as the Subject returns to a safe posture wherein the lights would be automatically restored to an off position by decreasing in intensity over time.

Research has shown that green lighting is calming especially among the population of older adults with dementia. Certain embodiments provide the ability to pre-configure an automatic light color change once the subject has transitioned back to a safe position. In other words, the color of the lights could optionally change as the lights automatically dim over a specified period to an off position. The transition to darkness (i.e. turning off the light) could be linear or non-linear. In other words, if the light is configured to go from 100% on to 0% on over 100 minutes, the intensity could be decreased by 1% per minute. Alternatively, the intensity could be decreased using a non-linear mathematical algorithm.

The method 170 described above will now be described in the context of two use cases.

Use Case 1

The change in posture from lying to sitting and ultimately standing would be detected and messages sent to a light module to slowly bring the lights up to full intensity.

In this use case, the flow may be as follows:

The body position is detected to have changed to a standing position.

A message is sent to the light(s) or light module(s) to turn on. The light(s) or light module(s) would have been previously configured for a linear or non-linear increase in intensity.

Optionally, notify the mobile application that the light is on (indicating that the person being monitored is in motion).

Use Case 2

In contexts where more than one person is present, but only one person needs the lights on during their posture transitions, then person identification or recognition methods would be used to determine whether the lights should be turned on or not. In this use case, the light module would be associated with the person.

In this use case, the flow is envisioned to be as follows:

The body position is detected to have changed to a standing position.

The person is recognized to be someone being monitored.

A message is sent to the light(s) or light module(s) to turn on. The light(s) or light module(s) would have been previously configured for a linear or non-linear increase in intensity.

Optionally, notify the mobile application that the light is on (indicating that the person being monitored is in motion).

Figure 4:
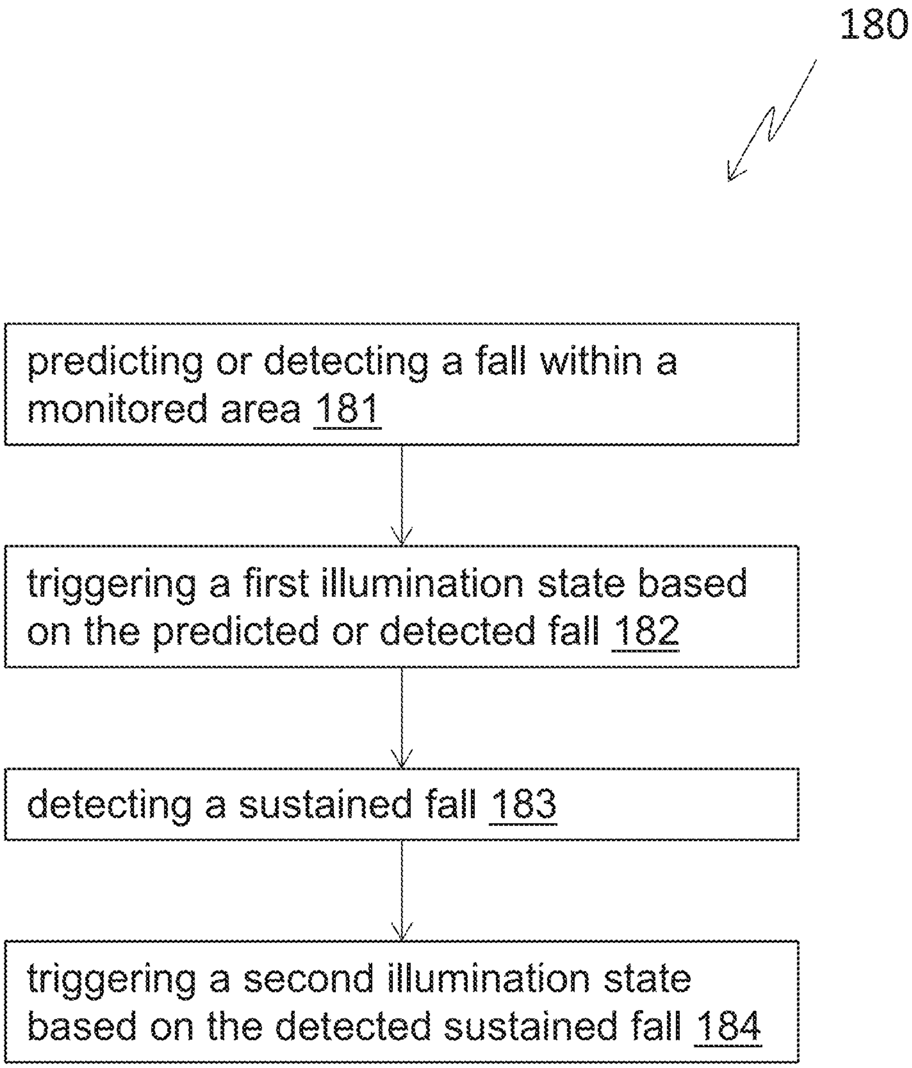
FIG. 4 is a flow chart of a method of operating safety lighting when a fall is predicted or detected according to one embodiment.

With reference now to FIG. 4, a method 180 to automatically highlight a fall or fall indication utilizing a light triggered by a monitoring system is described. As described above, current fall monitoring systems limit notifications to client devices such as mobile phones, tablets and personal computers. However, there are many scenarios when notifications to these devices might fall short of meeting the need. For example, in the context of an environment where there are detracting notifications, such as a care facility, or in a home with a hearing impaired partner, an audible notification or vibrating a device may not be as reliable. Embodiments of this current method 180 trigger a light to indicate an increased fall risk or that a fall has occurred. This method relies on a system to detect movement based on posture detection. Examples include cameras and/or wireless technologies such as Wi-Fi radar or doppler. A trigger from such a system would be used to control a light or light module to turn it on and off.

In one embodiment, if a fall is detected:

A light is triggered on by one or a plethora of fall detection monitoring systems when a person who is being monitored, falls. The cloud sends a message to the light(s) or light module(s) to turn on, and concurrently or sequentially. The cloud sends a message to the mobile app informing which light(s) are on. Alternatively, after the fall event is detected, the cloud sends a message to the sensor to turn on light(s) or light module(s), the sensor sends a message to the light(s) or light module(s) to turn on, and concurrently or sequentially (e.g. using Bluetooth), and the cloud sends a message to the mobile app informing which light(s) are on. The light may remain on for the duration of the time the person is detected to be in a felled position. The light may be turned off via an application interface (such as a mobile app) or when the felled indication is removed, or power is no longer applied. The light may automatically increase intensity, changes color and/or flashes the longer the person remains in a felled position. The light can be used as a notification device to alert someone in a different location (i.e. not co-located with the person being monitored).

In one embodiment, if an increased risk of a fall is detected:

A light is triggered on by one or a plethora of fall detection monitoring systems when a person who is being monitored becomes a fall risk as a result of their current actions (e.g. they have been previously identified as a fall risk and have stood up without the aid of an assistive device or a caregiver). The cloud sends a message to the light(s) or light module(s) to turn on, and concurrently or sequentially. The cloud sends a message to the mobile app informing which light(s) are on. Alternatively, after the fall event is detected, the cloud sends a message to the sensor to turn on light(s) or light module(s), the sensor sends a message to the light(s) or light module(s) to turn on (e.g. using Bluetooth), and concurrently or sequentially, and the cloud sends a message to the mobile app informing which light(s) are on. The light may remain on for the duration of the time the person is detected to be at risk. The light may be turned off via an application interface (such as a mobile app) or when the risk indication is removed, or power is no longer applied. The light can automatically increase intensity, change color and/or flash the longer the person remains at risk. The light may be used as a notification device to alert someone in a different location (i.e. not co-located with the person being monitored).

In another embodiment, the sensor detects the fall risk or fall and notifies the cloud, the cloud sends a message to the light(s) or light module(s) to turn on, and concurrently or sequentially, and the cloud sends a message to the mobile app informing which light(s) are on. The sensor detects the fall risk or fall. The sensor sends a message to the light(s) or light module(s) to turn on (e.g. using Bluetooth), and concurrently or sequentially, the sensor notifies the cloud, and the cloud sends a message to the mobile app informing which light(s) are on.

Figure 5:
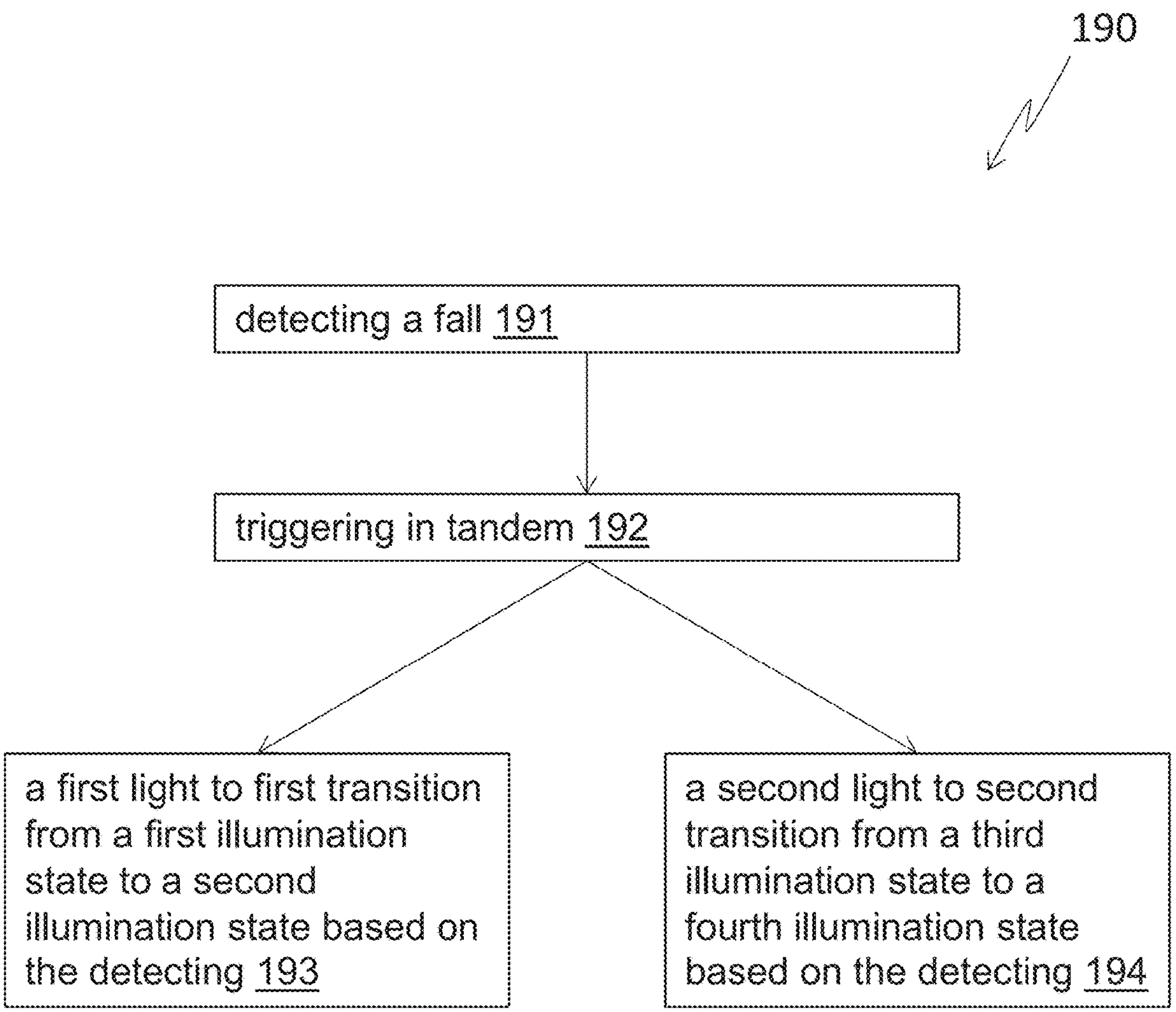
FIG. 5 is a flow chart of a method of coordinating increasing or decreasing intensity of a set of lights over time according to one embodiment.

With reference now to FIG. 5, a method 190 to coordinate increasing or decreasing the intensity of lights over time is described in one embodiment. The primary context for coordinating the automatic synchronization of lighting is fall prevention and fall notification. Referring back to method 170 above where lights are triggered on in multiple locations, this current method 190 focuses on the synchronous control of these lights. The method 190 included for example the steps of detecting a fall 191, and triggering in tandem 192 a first light to first transition from a first illumination state to a second illumination state based on the detecting 193, and a second light to second transition from a third illumination state to a fourth illumination state based on the detecting 194.

For example, if a person falls in their bedroom, a light would be triggered in their bedroom and in at least one other location or room where a caregiver or someone who is able to help would also be notified. The reverse would also be true for synchronously triggering off the lights. In this method 190, the activation or management of more than one light or light module is coordinated. The lights would be activated together, increase or decrease in intensity in unison, and/or synchronously change color.

Figure 6:
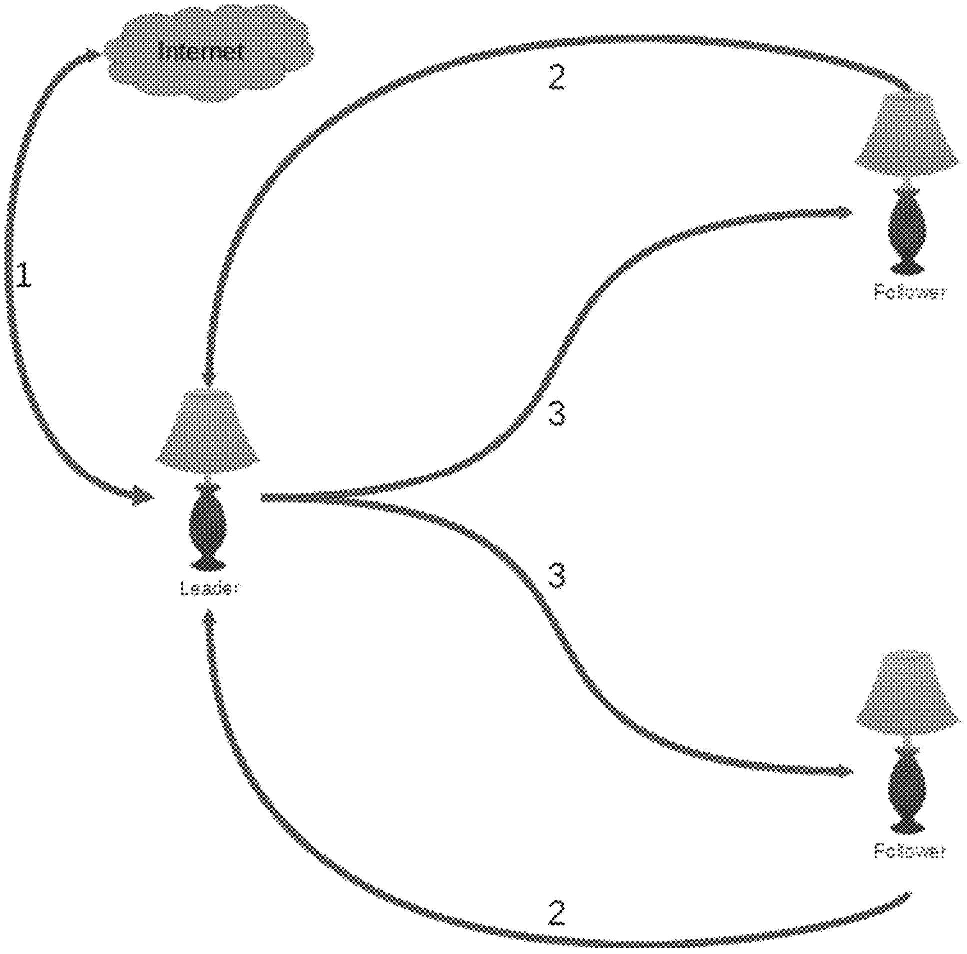
FIG. 6 is a functional diagram of a tandem lighting arrangement according to one embodiment.
Figure 7:
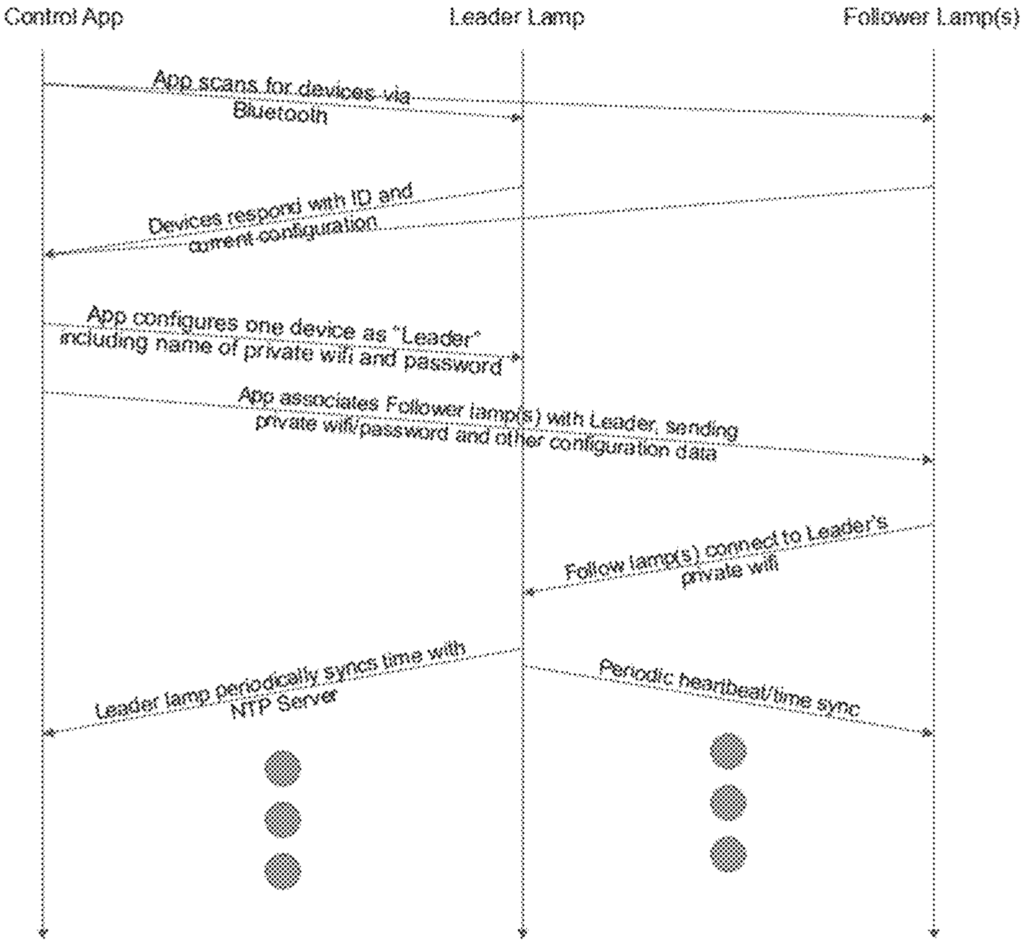
FIG. 7 is a functional diagram of a leader and follower lamp arrangement controlled by an app according to one embodiment.

One such embodiment is shown below with additional reference to FIGS. 6 and 7. Leader starts up and connects to the internet to sync its internal clock with a NTP server before starting up its private Wi-Fi SSID. Followers start up and connect to private Wi-Fi SSID from Leader. Leader registers each Follower and sends it regular updates such as configuration data, periodic time sync/heartbeat messages and lamp status/commands. On first set up devices boot into unconfigured mode. In this mode devices enable Bluetooth pairing mode so they can be detected/configured by an app. The app can scan for devices and will list all detected devices in unconfigured mode. A user selects one device to be the "Leader" and completes its configuration (including creating a unique private Wi-Fi network name/password). The app pushes configuration to "Leader" and Leader device starts the private Wi-Fi network and disables unconfigured mode. The user selects other devices to associate with Leader and pushes "Follower" configuration to them. Follower device(s) connect to Leader's private Wi-Fi network. Leader periodically sends heartbeat messages that contain (but not limited to) current time, desired brightness level, next brightness change time, and next brightness change level. The next change time and level are included in case of loss of connection/sync for any reason.

An exemplary architecture for implementing the methods described herein according to one embodiment has one or more of the following components:

A sensor (camera or Wi-Fi doppler or other monitoring system), a mobile application, a cloud server, one or more lights, and an access point (e.g. a router, modem, etc.). The light or light module will be assigned a unique ID (UID). Embodiments of the methods can be combined with motion detection technology, as they are not mutually exclusive.

The configuration process to enable use cases described herein can include steps to associate the light or light module to one or more of the following below according to one embodiment:

Start

ASSOCIATE light(s) with one or more sensors (or can associate light(s) with one or more persons).

User selects the UUIDs for the lights and/or sensors to perform the sensing of the motion and the control of the lighting.

Light Control Action: User selects increase the intensity of the lighting at a specific rate. Use a particular color.

Light Control Action: User selects decrease the intensity of the lighting at a specific rate. Use a particular color DEFINE Triggering Actions Light control association of conditions to actions: User selects detection of the elderly person transitioning from a safe position. Next, they would associate the light control action of increasing the intensity of the lighting at a specific rate using a particular color and the UUIDs of the lights and/or sensors of where the action can take place.

Light control association of conditions to actions: User selects detection of the elderly person transitioning to a safe position. Next, they would associate the light control action of decreasing the intensity of the lighting at a specific rate using a particular color and the UUIDs of the lights and/or sensors of where the action can take place.

Light control association of conditions to actions: User selects detection of the elderly person walking. Next, they would associate the light control action of increasing the intensity of the lighting at a specific rate using a particular color and the UUIDs of the lights and/or sensors of where the action can take place.

User selects motions that indicate transitioning from a safe position.

User selects the UUIDs for the lights and/or sensors to perform the sensing of the motion and the control of the lighting. They would select all the lights where they want the light control actions to be taken for this use case. Also, they would select all the sensors in the areas where the elderly selected would be to detect the motions defined.

Associate Mobile Application with Light(s)

User selects a specific notification to be sent to a particular Mobile Application when this action is taken. This assumes that we leverage the pre-existing capability of the home health device system to send a notification to a particular mobile device AND that the mobile app is already associated with a sensor and/or person End In one embodiment, the triggering process to activate a light or light module would be as follows:

Start

Detect triggering condition which could be one or more of the following:

A fall detected by a monitoring system.

A mobile application control.

A push-button or switch on a pre-configured light.

An identified fall risk such as someone getting out of bed or moving without an assistive device.

The home health monitoring devices detect this transition. The system knows where the condition took place using the preconfigured UUIDs for the sensors in the bedroom Turn on Light(s)

The home health monitoring device increases the intensity of the lighting at a specific rate and color for the lights in the bedroom. It uses the preconfigured UUIDs of the lights in the bedroom.

The elderly person transitions from a safe position in the bedroom.

The elderly person walks from bedroom to bathroom.

The home health monitoring device senses this transition. It knows where the condition took place using the preconfigured UUIDs for the bathroom.

The home health monitoring device increases the intensity of the lighting and color for the lights in the bathroom. It uses the preconfigured UUIDs of the lights in the bathroom.

Check Triggering Condition:

Is condition still true?

YES, light(s) remain on.

Figure 8:
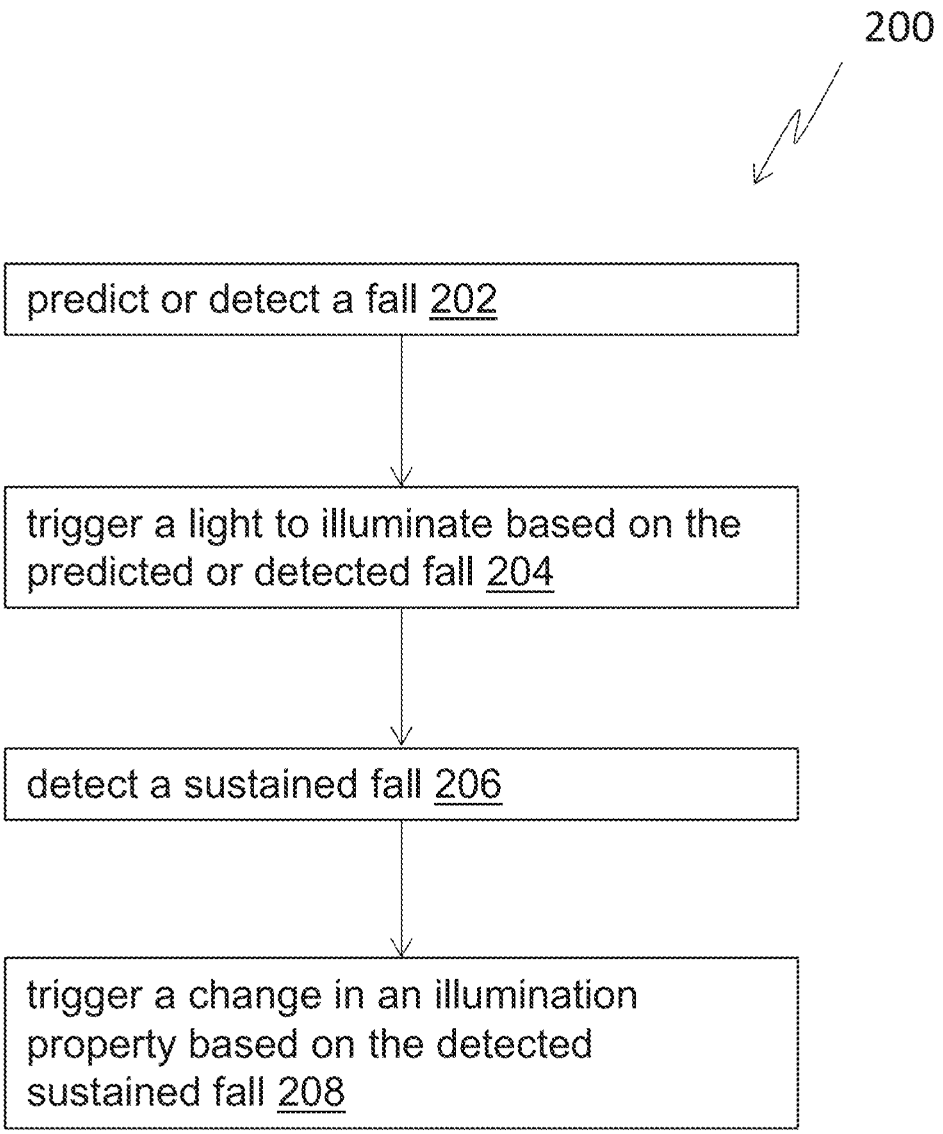
FIG. 8 is a flow chart of a method for automatically highlighting a fall utilizing a light triggered on by a monitoring system.

NO, turn off light(s). Note: If there is no sensor or monitoring system, the "off" signal would be the result of an expired timer End With reference now to FIG. 8, a method for operating safety lighting 200 when a fall is predicted or detected includes the steps of predicting or detecting a fall 202, triggering a light to illuminate based on the predicted or detected fall 204, detecting a sustained fall 206, triggering a change in an illumination property based on the detected sustained fall 208. When a non-felled position is detected, the light can return back to a default illuminated state, which may be for example off, or low light. The change in illumination property is at least one of intensity, color or flashing. The light or a separate system light can for example be located outside the monitored area to alert somebody else to check on the condition of the person being monitored.

Embodiments of the method utilize a system to detect movement based on posture detection. Examples include cameras and wireless technologies such as Wi-Fi Doppler. A trigger from such a system can be used to control a light module to turn it on and off. In one embodiment, the sensor detects a fall event, then: the sensor informs the cloud of the fall event, the cloud sends a message to the light module(s) to turn on, and concurrently or sequentially, and the cloud sends a message to a mobile app informing which light(s) are on. Alternatively, the flow after the sensor detects the fall event could be: the sensor informs the cloud of the fall event, the sensor sends a message to the light module(s) to turn on, and concurrently or sequentially (e.g. using Bluetooth), and the cloud sends a message to the mobile app informing which light(s) are on.

In one embodiment, the sensor detects and sends body posture changes to the cloud. The cloud interprets the change as a fall event and initiates communication to the light module and mobile app as indicated above. Additionally, the light color could be changed based on the emergent condition (e.g. RED=Fall, YELLOW=At risk). These colors and their meaning would be configurable by the controlling application.

In one embodiment, a system and method to automatically increase or decrease the intensity of a light over time is described. For example, a person (or persons) retires for the night but desires a slow transition from light to darkness. The person might want to read for a half-hour before turning out the light. Some couples want to talk in bed before turning out the lights. This use case enables the lights to slowly dim over a specified period until the lights are off. The transition to darkness (i.e. turning off the light) could be linear or non-linear. In other words, if the light is configured to go from 100% on to 0% on over 100 minutes, the intensity could be decreased by 1% per minute. Alternatively, the intensity could be decreased using a non-linear mathematical algorithm. This method may also include increasing the intensity of a light for someone getting out of bed in a low-light context. For example, if an elderly person being monitored is determined to go from a sitting or laying position to a standing position, the light would be triggered on and would increase in intensity, giving them the opportunity for their eyes to adjust.

Figure 9:
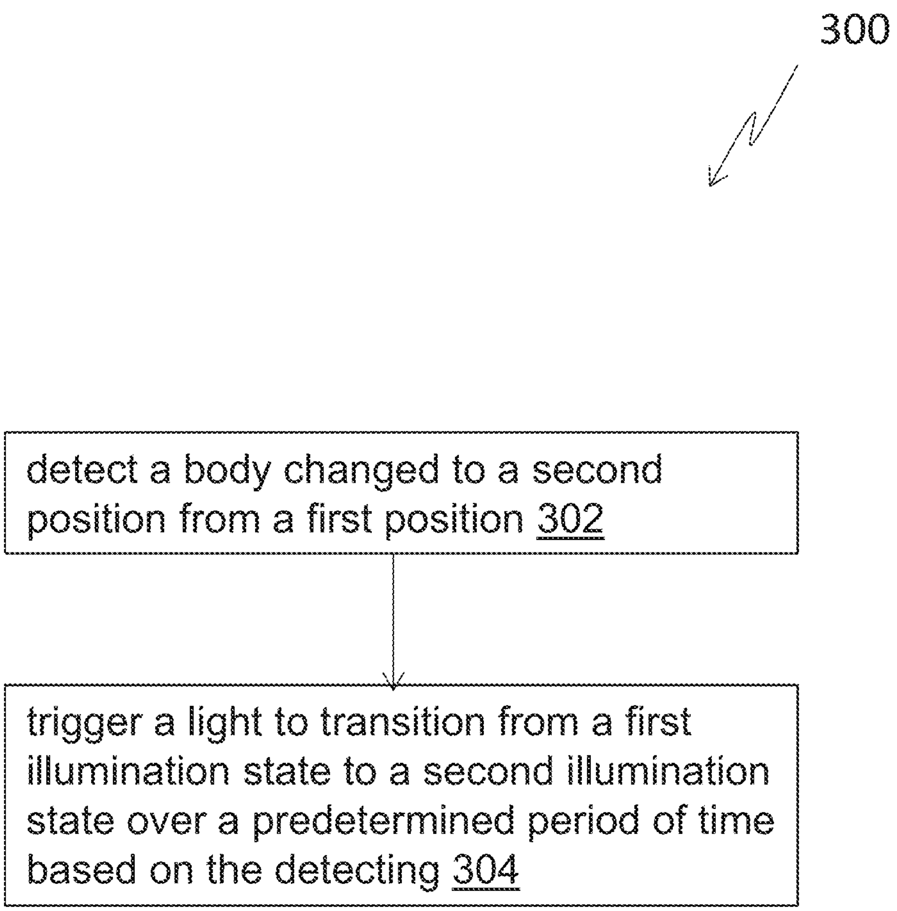
FIG. 9 is a flow chart of a method to automatically increase or decrease the intensity of a light based on a body position according to one embodiment.

Accordingly, with reference now to FIG. 9, a method to automatically increase or decrease the intensity of a light triggered by a monitoring system (e.g. a camera system) 300 includes the steps of detecting a body changed to a second position from a first position 302 triggering a light to transition from a first illumination state to a second illumination state over a predetermined period of time. The first position can be for example laying down, sitting or standing. The second position can be for example a change to laying down, sitting or standing. The second illumination state can be higher or lower intensity than the first illumination state depending on what type of transition is being detected (e.g. laying down to sitting, standing to sitting, etc.). The transition can be linear, non-linear or algorithmic. The transition type can be selected corresponding to the set of first and second positions detected. A step may also include recognizing the body as a person to be monitored, based for example on facial recognition or some other signature.

The detected transition may also be indicative of predicting a fall, not necessarily detecting a fall. For example, the transitions may detect movement indicative of a person that is struggling to find balance, struggling to stand, struggling to sit, scrambling for objects to hold for stabilizing their stance, or is otherwise moving a way that meets a threshold for a heightened likelihood for an imminent fall. Other factors that the system may consider for determining a heightened likelihood for an imminent fall include for example input from a system health professional about change in medications effecting balance, complaints of dizziness or falls, changes to diet with temporary effects on balance, detected adverse weather conditions for spaces exposed to the outdoors, or other inputs such as identifying that a person who should be using an assistive device such as a walker, wheelchair, cane or care provider (i.e. someone who can assist them) that is attempting to walk without the assistive device.

"Instant on" lights to full intensity can be startling and blinding in low light contexts. This method enables a slow transition from dark to light as someone is getting out of bed, for example.

Example 1

This change in posture from lying to sitting and ultimately standing would be detected and messages send to a light module to slowly bring the lights up to full intensity.

In this use case, the flow is envisioned to be as follows:

(a) The body position is detected to have changed to a standing position.

(b) A message is sent to the light module to turn on. The light module would have been previously configured for a linear or non-linear increase in intensity.

(c) Optionally, notify the mobile application that the light is on (indicating that the person being monitored is in motion).

Example 2

In contexts where more than one person is present, but only one person needs the lights on during their posture transitions, then person identification or recognition methods would be used to determine whether the lights should be turned on or not. In this use case, the light module would be associated with the person.

In this use case, the flow is envisioned to be as follows:

(a) The body position is detected to have changed to a standing position.

(b) The person is recognized to be someone being monitored.

(c) A message is sent to the light module to turn on. The light module would have been previously configured for a linear or non-linear increase in intensity.

(d) Optionally, notify the mobile application that the light is on (indicating that the person being monitored is in motion).

In one embodiment, a system and method to coordinate automatically increasing or decreasing the intensity of lights over time is described. More than one light that is coordinated and concurrently controlled in a synchronized manner. For example, if a person falls in their bedroom, a light would be triggered in their bedroom and in at least one other location or room where a caregiver or someone who is able to help would also be notified.

Figure 10:
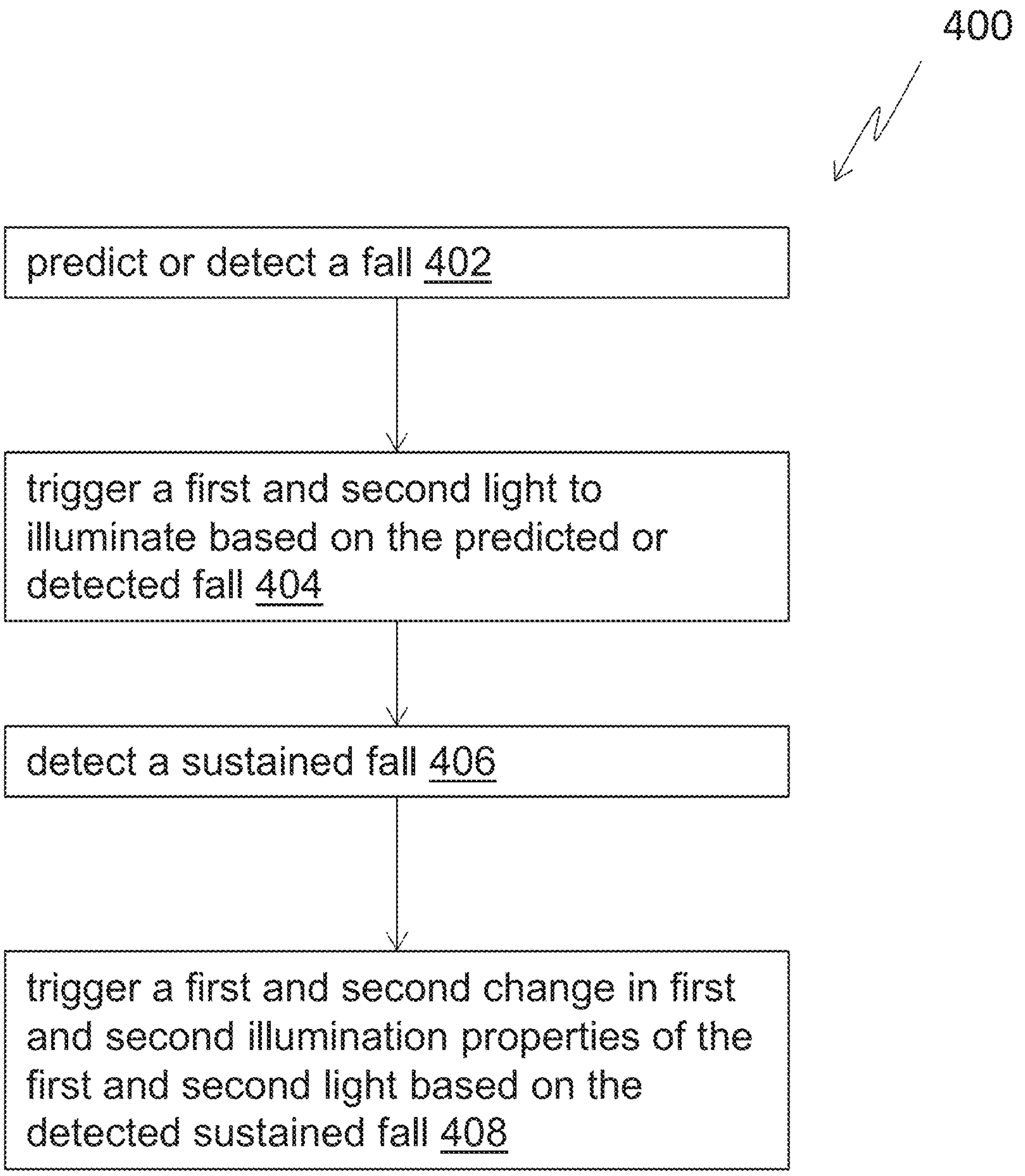
FIG. 10 is a flow chart of a method for tandem operating safety lighting when a fall is predicted or detected according to one embodiment.

Accordingly, with reference now to FIG. 10, a method for tandem operating safety lighting 400 when a fall is predicted or detected includes the steps of predicting or detecting a fall 402, triggering a first and second light to illuminate based on the predicted or detected fall 404, detecting a sustained fall 406, triggering a first and second change in first and second illumination properties of the first and second light based on the detected sustained fall 408. The first and second illumination property are the same. The first and second illumination property are different. When a non-felled position is detected, both lights can return back to a default illuminated state, which may be for example off, or low light. The change in illumination property is at least one of intensity, color or flashing. The first light may be located in the monitored area while the second light is outside the monitored area.

Activation or management of more than one light or light module is coordinated. The lights would be activated together, increase or decrease in intensity in unison, and/or synchronously change color. With reference to FIGS. 6 and 7, in one embodiment, Leader starts up and connects to the internet to sync its internal clock with a NTP server before starting up its private Wi-Fi SSID. Followers start up and connect to private Wi-Fi SSID from Leader. Leader registers each follower and sends it regular updates such as: configuration data, periodic time sync/heartbeat messages and lamp status/commands. On first set up devices boot into unconfigured mode. In this mode devices enable Bluetooth pairing mode so they can be detected/configured by app. The app can scan for devices and will list all detected devices in unconfigured mode. The user selects one device to be the "Leader" and completes its configuration (including creating a unique private Wi-Fi network name/password). The app pushes configuration to "Leader" and Leader device starts the private Wi-Fi network and disables unconfigured mode. The user selects other devices to associate with Leader and pushes "Follower" configuration to them. The Follower device(s) connect to Leader's private Wi-Fi network. The Leader periodically sends heartbeat messages that contain (but not limited to) current time, desired brightness level, next brightness change time, and next brightness change level. The next change time and level are included in case of loss of connection/sync for any reason.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A method of coordinating increasing or decreasing intensity of a set of lights over time, the method comprising:

detecting a fall or fall risk in a monitored area;

triggering in tandem:

a first light to first transition from a first illumination state to a second illumination state based on the detecting, wherein the first light is located within the monitored area, and a second light to second transition from a third illumination state to a fourth illumination state based on the detecting, wherein the second light is located outside of the monitored area; and increasing an intensity of the second illumination state based on a plurality of updated detections of a sustained fall;

wherein the first transition comprises a gradual increase in an illumination property over a preset time;

wherein the preset time is selected from a plurality of preset times, each of the plurality of preset times corresponding to a type of detected fall or fall risk; and wherein the first transition and the second transition are different.

2. The method of claim 1 further comprising:

triggering a return to a default illumination state when a non-felled position is detected.

3. The method of claim 1, wherein the first transition comprises a change in an illumination property from a prior illumination state, the illumination property comprising at least one of intensity, color or flashing.

4. The method of claim 1 further comprising:

holding the second illumination state based on a plurality of updated detections of a sustained fall.

5. The method of claim 1, wherein the gradual increase is a linear increase.

6. The method of claim 1, wherein the gradual increase is a non-linear increase.

7. The method of claim 1, wherein the gradual increase is algorithmic.

8. The method of claim 1, wherein Increasing the illumination property comprises increasing an illumination property in a subset of lights.

9. The method of claim 8, wherein the subset of lights is selected based on location of the detected fall or fall risk.

10. The method of claim 8, wherein the subset of lights is selected based on a type of detected fall or fall risk.

11. The method of claim 1 further comprising:

determining if a subject is a person to be monitored based on data associated with the detected fall or fall risk.

12. A system for coordinating increasing or decreasing intensity of a set of lights over time comprising:

a camera, the first light and the second light communicatively coupled to a controller configured to execute the method of claim 1.

* * * * *